Figure 1:
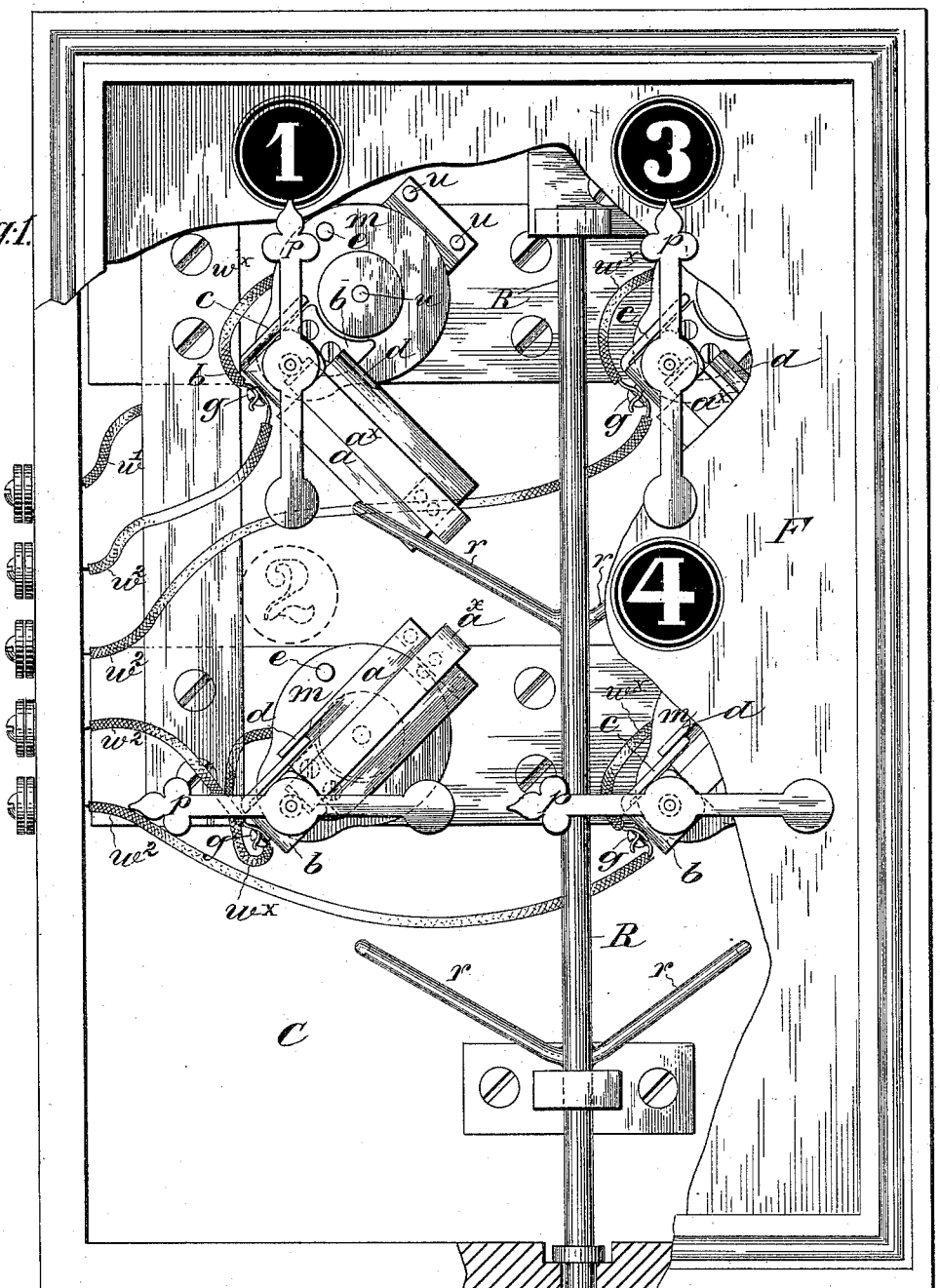

(No Model.) 2 Sheets—Sheet 1.

J. R. HARD.
ELECTRICAL ANNUNCIATOR.

No. 492,519. Patented Feb. 28, 1893.

WITNESSES:
Herbert Blossom.
Peter A. Ross

INVENTOR:
John R. Hard
By Henry Connell
Attorney.

THE NORRIS PETERS CO., PHOTO-LITHO., WASHINGTON, D. C.

(No Model.) 2 Sheets—Sheet 2.
J. R. HARD.
ELECTRICAL ANNUNCIATOR.
No. 492,519. Patented Feb. 28, 1893.
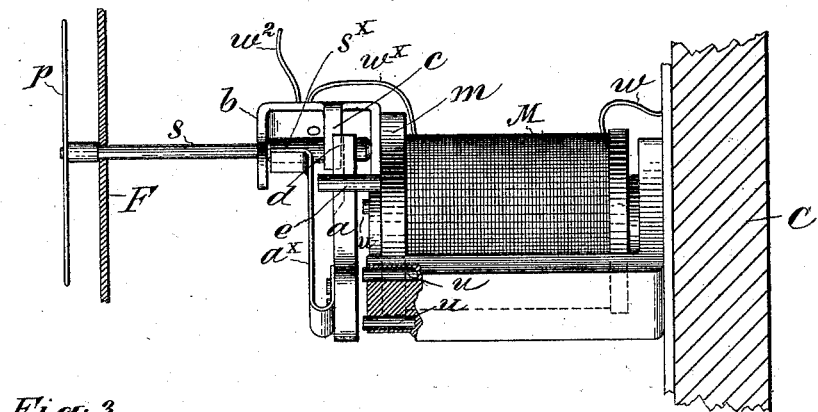
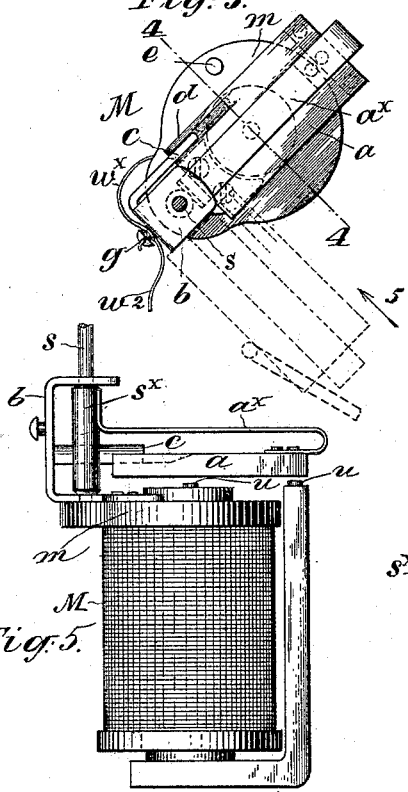
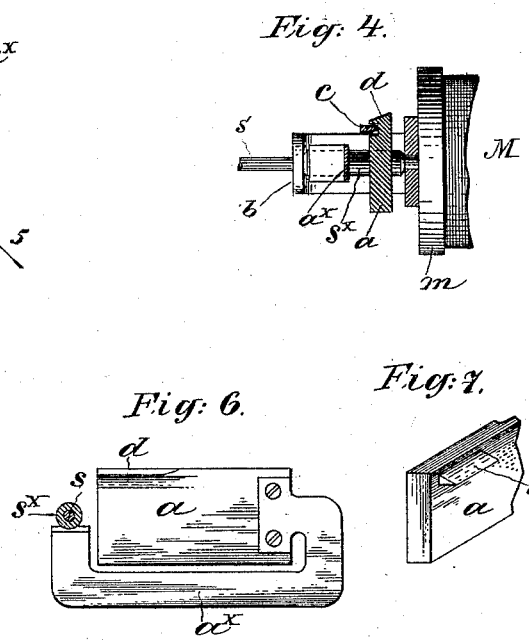
WITNESSES:
Herbert Blossom.
Peter A. Ross
INVENTOR:
John R. Hard
By Henry Connett
Attorney.

UNITED STATES PATENT OFFICE.

JOHN RANDOLPH HARD, OF NEW YORK, N. Y.

ELECTRICAL ANNUNCIATOR.

SPECIFICATION forming part of Letters Patent No. 492,519, dated February 28, 1893.

Application filed October 8, 1892. Serial No. 448,225. (No model.)

*To all whom it may concern:*

Be it known that I, JOHN RANDOLPH HARD, a citizen of the United States, residing in the city, county, and State of New York, have invented certain new and useful Improvements in Electrical Annunciators, of which the following is a specification.

My invention relates to the class of annunciators such as are used in hotels and the like, and wherein, when the circuit is closed through an electro-magnet the movement of the armature of the magnet releases a weight which falls and thus sets a semaphore or visible signal or the like, usually a pointer which points to the number of the room in the hotel where the circuit was closed.

One object of my invention is to provide a support or catch for the operating weight which will be disengaged by a very weak current, but which will, at the same time, resist detachment or disengagement by jars or shaking such as it may be subjected to in use. In other words, the principal object is to secure reliability of the annunciator. I also utilize the armature itself, as a weight.

The invention is embodied in an annunciator illustrated in the accompanying drawings, wherein—

Figure 1 is a front view of such an annunciator, having four indicators. The same arrangement may, however, be used for any number of indicators. Fig. 2 is a plan view of one of the indicators, parts of the annunciator casing being represented in section. Fig. 3 is a front view of the indicator with the pointer removed. Fig. 4 is a sectional view, of the indicator in the plane of the line 4, 4, in Fig. 3, but on a little larger scale than Fig. 3. Fig. 5 is an underside view of the indicator as seen from the direction indicated by arrow 5 in Fig. 3. Figs. 6 and 7 illustrate slight modifications.

The main features of the invention reside in the indicators, which I will now describe, premising that as these indicators are all alike, a description of one will suffice for all.

Referring particularly to Figs. 2, 3, 4 and 5,—M is the electro-magnet of the indicator, and $a$, its vibrating armature.

Mounted, as here shown, on the non-metallic magnet-bobbin $m$, is a bracket $b$, which may be bent up into a U-like shape from a piece of sheet metal. In this bracket bearings are provided for a spindle $s$, the axis of which is substantially parallel with that of the magnet coil. For convenience of construction, the spindle has fixed on it, between its bearings in the bracket, a sleeve $s^x$. On the outer end of the spindle is secured a pointer $p$.

The manner of mounting and arranging the armature $a$, and its spring $a^x$, is somewhat peculiar. The spring is secured at one end to the spindle $s$, or, what is the same, to the sleeve $s^x$ which forms a part of the spindle, and at its other end, which is farthest from the spindle, it is secured to the outer end of the armature, this latter lying substantially parallel with the spring and between the latter and the poles of the magnet. By this construction and arrangement, the free extremity of the armature is that nearest the spindle and consequently nearest to the point where the spring is attached to the spindle. This peculiar construction renders the free end of the armature very susceptible to even a feeble attraction of the magnet, and at the same time allows of considerable vibration and movement toward and from the magnet of the outer ends of the armature and spring, arising from sudden jars or jolts, and from shaking, without such movements affecting the free end of the armature in any material degree. The advantage of this will be explained hereinafter.

In mounting the indicator in the annunciator casing, the axis of the magnet and of the spindle $s$, will be arranged substantially horizontal, and the armature will be supported against gravity by means of a stop-pin or projection, $c$, which takes under a shoulder, $d$, on the outer face of the armature at its free end. As here shown, the stop-pin $c$ is formed in one piece with the bracket $b$ and slightly beveled, as is also the upper side or edge of the armature (see Fig. 4) so that when the armature is raised to its normal position, as represented in full lines in Fig. 3, the armature wipes over the stop-pin and the latter engages or takes under the shoulder $d$. If a current of electricity be now sent through the coil of the magnet M, the armature will be attracted and thus drawn away from the stop-pin, and when freed therefrom it will fall by gravity to the position indicated in dotted lines in Fig. 3. The armature thus serves as a weight to rotate the spindle s and the pointer p, through a part of a complete rotation, usually and preferably through a quarter of a complete rotation.

Fig. 1 illustrates the manner of arranging the indicators to form an annunciator. C is a casing, which will usually be of wood and of any desired size. Only four indicators are here shown in the casing, but there may be any number. Over the face of the casing will be fitted a front-plate F, portions of which are broken away in Fig. 1 to show the indicators behind it. The several spindles, s, of the indicators will pass through the plate F, and on their outer, projecting ends, in front of the plate, will be secured the respective pointers, p. One terminal w of the wire of each indicator magnet will connect electrically with a wire $w'$, of the circuit and the other ends $w^\times$ of the respective magnet coils (see Figs. 3 and 4) will be led to screws or binding posts, g, in the respective brackets b; from these binding posts the circuit wires $w^2$ lead away out of the casing C.

On the face plate F will be marked conspicuous numerals 1, 2, 3, 4, &c., one for each indicator, in the usual way, and the pointers p may be arranged to stand, normally, horizontal, and when the circuit is closed through the coil of an indicator magnet, the armature of that indicator will fall and rotate the pointer until it points toward the numeral on the face plate corresponding to that indicator. In Fig. 1 some of the indicator pointers are shown in their normal horizontal positions, and some as pointing toward the numerals.

The arrangement of the annunciator illustrated, and the arrangements of the circuits in the building, are well known and form no part of my present invention.

I prefer to arrange the armature of the indicator to stand inclined, normally, at about an angle of forty-five degrees, as seen in Figs. 1 and 3, for reasons that I will now explain. After one or more indicator armatures have fallen, the attendant proceeds to replace or set them again in their normal positions by means of a vertically arranged replacing slide or rod, R, mounted in guides in the casing and having branches, r, one for each indicator. When the armature of an indicator is released and falls, it strikes and rests on a branch r, which thus forms a stop to limit its descent; and by pushing upward on the end of the rod R, which projects from the bottom of the casing, the armature is raised to its normal position again. To prevent the armature from being raised unnecessarily high some form of limiting stop should be provided, and I provide such a stop by setting a pin, e, in the bobbin of each magnet for the upwardly moving armature to impinge against. When an electric current is sent through the magnet coil and the armature of the indicator is attracted the armature might fail to fall, although freed from its stop-pin, if the magnetic attraction were strong enough to overcome the effect of gravity on the armature, but by making the armature proportionately heavy this liability is overcome. I have also found that, as there is always a bell in the circuit to announce the call to the ear, the rapid interruptions of the circuit at the bell will assure against any liability of the armature being held against gravity when released from its stop-pin. When the armature a falls and rests upon the branch r of the metal rod R, the magnet is shunted out of the circuit. The current then flows from the wire $w'$ through metallic connections in the casing C to the slide-rod R, thence through the branch r of same to the armature a, thence to the binding-post g through metallic connections between the armature and said post, and thence out of the casing by way of wire $w^2$. The shoulder d may be formed by grooving the armature near its upper edge, as shown in Figs. 3 and 4, but this is merely to assure the pin taking under some part of the armature and at the outer face of the same whereby a very slight inward movement of the armature, when attracted, will withdraw it from the pin and release it.

In Fig. 7 the armature is shown furnished with a beveled projection forming the shoulder d.

I would say that the pointer p is a common device,—one of many forms of semaphores for designating the particular room from which the call is sent, and sometimes to designate what is wanted. Therefore I do not limit myself to the use of this or any particular kind of signal, pointer, or like device operated by the rocking of the spindle s in its bearings.

My invention relates to the means for rocking or rotating the spindle, independently of what special result is effected by such movement of the spindle.

It will be seen that by arranging the free end of the armature adjacent to the spindle or center of rotation, where there is very little vibration from jars, and by placing the stop-pin at this point, the armature will be sensitive to magnetic attraction but not sensitive to jars and shaking.

It is not absolutely necessary that the armature be arranged between its spring and the poles of the magnet; the armature and spring may be arranged side by side, as in the detached view Fig. 6.

In order to prevent the armature from coming in contact with the poles of the electro-mangnet, where it might adhere because of residual magnetism, I prefer to set in the pole-pieces pins or bits of copper, u, which project slightly beyond the poles, as seen in Figs. 2 and 5. In Fig. 2 I have broken away one of the pole-pieces to show the pins.

Having thus described my invention, I claim—

1. In an indicator for an annunciator, the combination with an electro-magnet and a spindle mounted to rock in bearings with its axis substantially parallel with the axis of the magnet, of the armature spring, secured at one end to said spindle and extending radially therefrom and secured at its other extremity to the armature, and a stop-pin arranged to take under a part of the armature between the points where the spring is attached respectively to the armature and the spindle, substantially as set forth.

2. In an indicator for an annunciator, the combination with an electro-magnet and a spindle mounted to rock in bearings with its axis substantially parallel with the axis of the magnet, of the armature spring, secured at one extremity to said spindle and extending radially therefrom, and at its outer extremity secured to the outer end of the armature, the said armature having its free end arranged adjacent to said spindle, and a stop-pin arranged to take under some part of the armature near its free end, whereby, when the armature is attracted by the magnet, it will be freed from said pin, as set forth.

3. In an indicator for an annunciator, the combination with an electro-magnet M, and a spindle, $s$, mounted to rock in bearings with its axis substantially parallel with the axis of the magnet, an armature, $a$, arranged before the pole of the magnet, a leaf spring $a^x$, secured at one end to said spindle and projecting radially therefrom substantially parallel to the armature, and at its other end to that end of the armature which is farthest from the spindle, whereby the free end of the armature is adjacent to the point where the spring is secured to the spindle, and a stop-pin, $c$, arranged to take under some part of the armature near its free end and support it, normally as set forth.

4. The combination with an annunciator casing, the circuit wires $w'$, and $w^2$, and the branched slide rod R, electrically connected with the circuit wire $w'$, of the indicator, comprising a horizontally arranged magnet M, having one of its terminals, $w$, electrically connected with the wire $w'$, and its other terminal connected with the wire $w^2$, at a binding post $g$, the said binding post, the spindle $s$, the bearing bracket, the armature and its spring all electrically connected with said binding post, the branch on the slide rod being arranged in position to contact electrically with the armature when it falls, whereby the magnet M is shunted, as set forth.

In witness whereof I have hereunto signed my name in the presence of two subscribing witnesses.

JOHN RANDOLPH HARD.

Witnesses:
HENRY CONNETT,
JAS. KING DUFFY.